Patented Nov. 14, 1933

1,935,129

UNITED STATES PATENT OFFICE 1,935,129

CELLULOSE FIBER OF LOW SOLUTION VISCOSITY AND PROCESS OF PRODUCING THE SAME

George A. Richter, Berlin, N. H., assignor to Brown Company, Berlin, N. H., a corporation of Maine No Drawing. Application June 17, 1929
Serial No. 371,710

11 Claims. (Cl. 260—10)

In the manufacture of various cellulose derivatives or products such as artificial silk, lacquers and films, it is the practice to convert cellulose fiber into a derivative such as xanthate, nitrate or acetate, and then to dissolve the derivative in a suitable solvent or mixture of solvents before forming into the ultimate product. In order to produce cellulose solutions of a viscosity sufficiently low to permit spinning into silk, or for use as lacquers, or for forming into films, it is necessary to lower the solution viscosity of the fiber used as a raw material, or to treat the derivative prepared therefrom in a manner to lower its viscosity. The term "solution viscosity", as herein applied to cellulose fiber, is an arbitrary one, being indicative of the viscosity of a cellulose derivative solution producible therefrom. The solution usually employed as a standard is a cuprammonium cellulose solution of definite cellulose concentration, the viscosity being determined by measuring the time of efflux of a definite volume of such solutions under standard conditions through an orifice of standard size. The solution viscosity of fiber is herein given in absolute c. g. s. units, and is determined by measuring the viscosity of a solution of 6 grams of dry fiber in a cuprammonium solution composed of 225 cc. of 28% ammonia water containing 9 grams of cuprous oxide. The c. g. s. unit is employed because it is definite, approximating a viscosity 100 times that of water at 20° C., wherefore a cuprammonium cellulose solution prepared from a certain type of fiber and by means of which such fiber is identified as having a solution viscosity of 10, is 1000 times as viscous as water at 20° C. Glycerin, which is often referred to as a standard when dealing with fiber solution viscosity, for example, has a solution viscosity value of between 8 and 10 units.

In the viscose-rayon industry, a lowering of the solution viscosity of the fiber is generally effected by soaking or submersing sheets of fiber (so-called drier sheets) in a caustic soda solution of mercerizing strength, pressing the sheets free of excess solution, disintegrating them into a fluffy mass of crumbs, and finally ageing the mass of soda-cellulose, so called, for a considerable period of time. Not only is such a process time-consuming and expensive, but ageing conditions must be carefully controlled to prevent serious degradation of the fiber into oxycellulose and other undesirable reaction products. A long-time ageing of soda cellulose not only results in a partial degradation of the fiber, but also in the formation of sodium carbonate, which reaction product is objectionable, particularly when the soda cellulose is subsequently converted into viscose. When the cellulose derivative is treated to lower its solution viscosity, as nitrocellulose sometimes is, under heat and pressure, not only must it be handled in comparatively small batches, but the treatment must also be carefully controlled to prevent violent decomposition from taking place.

One of the objects of the present invention is to provide a process for markedly lowering the solution viscosity of cellulose fiber while it is in the form of an aqueous pulp suspension, as this permits ready and continuous handling of large amounts of fiber in comparatively inexpensive apparatus. Another object of the present invention is to effect such viscosity lowering without impairing the value of the fiber as a raw material for conversion into cellulose derivatives. In my application Serial No. 293,503, I have disclosed that when cellulose fiber is treated with solutions of salts of certain of the acids of manganese, such as the manganates and the permanganates, a marked lowering of the solution viscosity of the fiber is effected without materially affecting the alpha cellulose content of the fiber. In that application, I have further described that alkaline permanganate solutions are more effective in lowering the solution viscosity of cellulose fiber than are neutral or acid solutions, and further that when mercerization of the fiber is not objectionable, the fiber may be advantageously treated with alkaline permanganate solutions under mercerizing conditions, as under such conditions a product of exceedingly high alpha cellulose content may be realized. Alkaline permanganate solutions, when of low alkalinity, may result in a reduction of the alpha cellulose content of the fiber, say, about 1% to 3%, depending upon the particular conditions of temperature and chemical concentration under which the treatment is effected, but the use of permanganate solutions under proper mercerizing conditions results in a low-viscosity fiber of higher alpha cellulose content than that of the high-viscosity fiber used as a raw material. These results obtainable with permanganate solutions under mercerizing conditions may perhaps be explained from the fact that in alkaline permanganate solutions there are two opposed tendencies, namely, the tendency of the permanganate to lower the solution viscosity of the fiber and to reduce alpha cellulose content by forming oxycelluloses, and the tendency of the alkali to lower the solution viscosity of the fiber somewhat and at the same time to increase alpha cellulose content by its dissolving action on the less-resistant celluloses and oxycelluloses. With a permanganate solution under mercerizing conditions, the reaction on the fiber may be controlled so as to favor the production of a product of high alpha cellulose content and at the same time to effect a rapid and drastic lowering of viscosity. The present application, which is a continuation in part of my application hereinbefore identified, deals with the treatment of cellulose fiber with mercerizing permanganate solutions.

The treatment of the present invention is preferably carried out under conditions resulting in a product having a solution viscosity below 1, as such a product is especially desirable for use as a raw material in the manufacture of cellulose derivatives such as cellulose xanthate, whereupon colored reaction products resulting from the treatment are preferably removed from the fiber.

In carrying out the process of the present invention, cellulose fibers of various origins may be employed as a raw material. For example, one may start with a white wood fiber refined to an alpha cellulose content of about 94%, and having a solution viscosity of about 5 to 9, with cotton linters, long-fibered cotton, or rag pulp having a solution viscosity of about 5 to 50, or with chemical wood pulp such as bleached sulphite pulp having an alpha cellulose content of about 86% to 87% and a solution viscosity of about 5 to 7. So, too, one may use raw or incompletely refined wood pulps such as unbleached, refined sulphite pulp, unbleached, unrefined sulphite pulp, or even unbleached kraft pulp or ground-wood pulp, as a raw material.

When an unbleached, raw pulp, such as unbleached sulphite pulp is used as a raw material, it may be refined before being subjected to the action of mercerizing permanganate solutions. This may be accomplished by treating the raw, unbleached pulp with a lignin-reactive agent such as chlorine water and/or hypochlorite bleach liquor, such agents dissolving lignin or rendering the lignin susceptible to solution by an alkaline liquor. For instance, unbleached sulphite pulp may be treated with chlorine water containing, say, 3% to 4% chlorine, based upon the weight of dry pulp, and then washed free from treating chemical and reaction products. An unbleached kraft pulp, which contains more lignin than unbleached sulphite pulp, may be treated with chlorine water containing, say, 5% to 6% chlorine, based on the weight of dry pulp, and then washed. The pulp may then be digested in alkaline liquors which serve to dissolve chlorinated reaction products and other non-alpha cellulose impurities. For instance, the pulp may be digested under atmospheric pressure in a boiling solution of caustic soda, sodium carbonate, sodium sulphide, lime, or the like, the solution containing from 5% to 10% alkali, based on the weight of dry pulp. The resulting product, being of higher alpha cellulose content than the raw pulp, consumes less alkali when treated with mercerizing permanganate solution, so that a given bath of such permanganate solution, may be reused for a longer period of time, less alkali being consumed by reaction with the pulp and less contamination and coloration of the solution being effected by reaction products. If desired, oxidants such as hypochlorite bleach, e. g., sodium hypochlorite, may be added to the mercerizing permanganate solution to assist in the reaction. Other oxidants, such as sodium peroxide, hydrogen peroxide, may be used together with the permanganate. If desired, a gaseous oxidant such as air or oxygen, under atmospheric or superatmospheric pressure, may be bubbled through the suspension of fiber in the chemical solution, as this also assists in reducing viscosity and thus allows the use of less permanganate to obtain a desired result. Small quantities of iron compounds, such as ferric nitrate, or their equivalent, may be added to the permanganate solution to catalyze or hasten the reaction on the fiber, in which case provision is preferably made to remove colored iron compound residues remaining on the fiber at the end of the treatment. Oxalic acid or acid oxalate solutions serve well for such purpose.

During a permanganate treatment, the fiber gradually assumes a dark brown or chocolate color, the depth of which depends on the amount of permanganate used, owing to the reduction of the intense purple permanganate to manganese oxides, some of which become deposited on the fiber. The fiber may be washed and then decolorized by treatment with an agent which reduces the manganese oxides to manganous salts. For instance, the fiber may be treated with sodium bisulphite or sulphurous acid solution, and then washed. If the raw pulp is refined before the permanganate treatment, as by chlorine or hypochlorite pretreatment and/or by alkaline digestion, as previously described, after the permanganate and decolorizing treatment, it is generally suitable for conversion into cellulose derivatives without further treatment.

Specifically, a treatment of cellulose fiber with permanganate solution under mercerizing conditions may be carried out as follows. The fiber may be admixed with an 18% caustic soda solution containing, say, about 1% to 3% sodium permanganate, based on the dry weight of pulp. In order to effect a uniform treatment, it is preferable that the fiber concentration in the treating liquor be comparatively low, the fiber being treated, for example, as a 3% to 5% suspension in the treating liquor. The treatment may be carried out at room temperature, say, 20° C., until a product of the desired solution viscosity and alpha cellulose content results. I have observed that a rapid lowering of viscosity takes place during the early stage of the treatment, and that there is not a marked increase in the alpha cellulose content of the fiber until the permanganate has been practically consumed, whereupon a progressive increase in alpha cellulose content takes place. After treating for about three or four hours, there is little permanganate in the liquor, and its caustic soda content has dropped to about 16% as a result of reaction upon non-alpha cellulose components in the fiber. Inasmuch as increase in alpha cellulose content of the fiber is appreciable after the permanganate is consumed, the treatment is preferably carried on for about six or seven hours, whereupon the fiber may be washed free of treating liquor, washing preferably being effected in apparatus of the counter-current type so that the treating liquor may be recovered without excessive dilution, and reused for the treatment of other fiber. Fresh caustic soda and permanganate may be added to the recovered liquor before its reuse. Or the treatment itself may be advantageously carried out in apparatus of the countercurrent type, operated as described, for instance, in my Patent No. 1,632,802, issued June 21, 1927, in which case the fiber is passed through a series of baths gradually increasing in concentration of treating chemical from substantially only water at one end of the series, toward an intermediate bath thereof, wherein mercerization may take place, and then gradually decreasing in concentration from the intermediate bath to substantially only water at the other end of the series. When the treatment is thus carried out, dilution of the chemical liquor may be avoided and the treated fiber leaving the apparatus may be freed of chemical liquor. The fiber is colored, even after washing, by manganese oxides fixed thereon during the permanganate treatment, but its decolorization may be readily effected by treatment with a sulphurous acid solution which serves to reduce the manganese oxides to colorless manganous salts. The decolorized fiber, when washed, is suitable for conversion into cellulose derivatives. If desired, it may be lightly bleached, such bleaching being desirable, for instance, when an unbleached kraft pulp is used as a raw material. Bleaching may, for example, be effected in a liquor containing about ½% hypochlorite bleach (either sodium or calcium base), based on the weight of dry fiber, and sufficient free alkali to maintain a condition of alkalinity throughout the bleaching operation. A product produced as hereinbefore described will have a solution viscosity of from .3 to 1.0 and an alpha cellulose content of about 93% to 98%, depending upon the type of fiber used as a raw material and the time of treatment with the permanganate solution.

The condition of the treatment hereinbefore described may be varied. For instance, the early stage of the treatment may be carried out under higher than room temperature, to accelerate the viscosity-lowering effect. I have found that a treatment of the fiber at about 40° C. for about one hour, for example, results in the consumption of the permanganate, but that a product of higher alpha cellulose content may be obtained if the treating liquor is permitted to cool or is artificially cooled to about 20° C., at which temperature the mercerizing effect of the liquor is realized. This temperature may be maintained until the fiber has attained an equilibrium alpha cellulose content.

I have found that more dilute than 18% caustic soda solutions containing permanganate may be used if the treatment is carried out at temperatures lower than 20° C., as the lower the temperature, the more dilute need be the caustic soda solution to effect mercerization of cellulose fiber. For instance, an 18% caustic soda solution is necessary to effect mercerization of cellulose fiber at 20° C., but the same degree of mercerization may be effected with a 10% solution at, say, 10° C. A low-temperature treatment may be advantageous when previous treatments have been carried out at room temperature in liquors containing 18% caustic soda, and the liquor recovered from washing has been diluted with wash water to a caustic soda concentration which does not cause mercerization of cellulose fiber at room temperature. If desired, however, the early stage of the treatment may be carried out at higher than room temperature, whereupon the treating liquor may be cooled to below room temperature to effect mercerization of the fiber. For instance, assuming that a permanganate solution containing 10% caustic soda is used, the first stage of the treatment may be carried out at, say, 40° C. until the permanganate has been consumed, whereupon the liquor and fiber may be reduced to a temperature of, say 8° to 10° C.

Solutions of alkalies other than caustic soda may be used under mercerizing conditions, for instance, solutions of potassium hydroxide or mixtures of potassium hydroxide and sodium hydroxide. I have hereinbefore stated that the alpha cellulose content of the fiber undergoes an increase as soon as the permanganate is consumed. This is generally true, but it is sometimes difficult to effect a reaction of the last portion of permanganate upon the fiber, particularly when the fiber has been pretreated with chlorine water and/or bleach liquor or has been refined to high alpha cellulose content. When the permanganate remaining at the end of, say, a four-hour treatment is appreciable, a few hours more of treatment may be necessary to effect a complete consumption of the permanganate during which additional time the fiber tends to undergo a reduction in alpha cellulose content. In order to shorten the time of preparation of the desired high alpha cellulose-containing fiber, after a treatment for about four hours it is sometimes preferable to add to the permanganate-containing alkaline solution an agent, e. g., a reducing reagent, which will react upon and destroy the residual permanganate. The addition of a reducing agent may not only destroy unconsumed permanganate, but may also reduce the undesirable manganese oxides formed during the treatment. Apparently, the manganese oxides play some part in preventing the attainment of a product of maximum alpha cellulose content, since when the manganese oxides, which are oxidizing agents, as well as the residual permanganate is destroyed, the final product will be of higher alpha cellulose content, owing to the fact that the final mercerizing action takes place in the absense of oxidizing agents. Specifically, sodium sulphide, which itself is an alkali and does not affect the caustic soda present in the liquor, may be used to advantage. While other reducing agents such as formaldehyde, certain forms of glucose, sodium sulphite, etc., may be used in lieu of sodium sulphide, nevertheless sodium sulphide possesses further advantages, in that it is a relatively inexpensive chemical and need not interfere with subsequent recovery and reuse of the treating liquor. Thus, excess sodium sulphide present in the recovered treating liquor may be oxidized with a suitable oxidizing agent, such as sodium base bleach, so that it will not react with permanganate added thereto for a succeeding treatment of fiber. Otherwise, permanganate in addition to that necessary for reaction upon the fiber would be consumed in reacting upon the sodium sulphide. Permanganate being more expensive than sodium bleach or the other usual commercial oxidants, it is preferable to oxidize residual sodium sulphide in the recovered treating liquor with such oxidants before the addition of permanganate thereto for carrying out a succeeding treatment of fiber.

A procedure in which sodium sulphide is added to effect a reaction upon unconsumed permanganate may be carried out substantially as follows. A cellulose fiber, e. g., any one of the types hereinbefore enumerated, may be treated at room temperature, say, 20° C., with a mercerizing caustic soda solution containing the desired amount of permanganate, as hereinbefore described. If desired, however, the treatment may be carried out at below room temperature, in which case a less concentrated caustic soda solution is necessary to effect the desired mercerization of the fiber; or the treatment may be carried out at above room temperature, say, 30° C., in order to hasten the reaction of the permanganate on the fiber. At the end of about four hours, the permanganate present in the liquor will have dropped considerably, at which time may be added to the liquor concentrated sodium sulphide solution in amount sufficient to react upon residual permanganate and to reduce the manganese oxides formed during the treatment. No more sodium sulphide need be added than to ensure the desired reactions, as excess sodium sulphide requires subsequent oxidizing treatment, as hereinbefore described, when the treating liquor is recovered for reuse in treating other fiber. Excess sodium sulphide in the treating liquor does not, however, interfere with the removal of less-resistant celluloses from the fiber, so that a one- or two-hour treatment after the addition of the sodium sulphide results in a product having an alpha cellulose content of 95% or greater. Such a procedure makes possible an accurate control of the solution viscosity of the resulting fiber, since the sodium sulphide may be added at the time when the viscosity of the fiber is at the desired value, whereupon comparatively little reduction in viscosity of the fiber takes place, the permanganate being quickly consumed by reaction with the sodium sulphide.

When the procedure of adding sodium sulphide to the treating liquor to destroy residual permanganate is not followed, the fiber after being washed free of treating liquor may contain residual permanganate, in which case it may be desirable to treat the washed fiber in a bath of fresh mercerizing liquor containing no oxidants but containing a small amount of a reducing agent, e. g., sodium sulphide, to remove manganese oxides remaining on the fiber after the washing operation. The fiber when thus treated for a while and then washed free of mercerizing liquor is assured of high alpha cellulose content.

If desired, the fiber may first be treated with an alkaline liquor containing permanganate, under non-mercerizing conditions, and then in an alkaline liquor under mercerizing conditions. For instance, the first treatment may be effected with a liquor containing, say, from 1% to 10% caustic soda, and the desired amount of permanganate, at or above room temperature. When a comparatively dilute alkaline solution, for instance a 1% caustic soda solution, is employed, the treatment may be carried out at elevated temperature, say, 100° C., in order to effect a rapid reaction of the permanganate on the fiber and accordingly a rapid reduction of fiber viscosity. The fiber may then be washed free of treating liquor and delivered into a bath of an alkali content and under temperature conditions designed to effect mercerization. Or the fiber may be kept in the liquor, and caustic soda or concentrated caustic soda solution, as in the form of a 50% solution, may be added thereto in amount sufficient to bring the alkalinity to mercerizing strength. After mercerization of the fiber has been effected and a product of high alpha cellulose content has been produced, the fiber may be washed free of mercerizing liquor.

An important advantage residing in all of the treatments hereinbefore described is that lignins, resins and other non-alpha cellulose components in the fiber are removed, making possible the production of better grade cellulose derivatives, as such components, even when present in comparatively small amount, tend to discolor derivatives and to render them unstable. A further important advantage is that such fiber is especially suitable for conversion into cellulose xanthate, as no ageing of a soda-cellulose prepared therefrom is necessary. Thus, a soda-cellulose prepared from the resulting fiber of low solution viscosity may be directly xanthated and a solution of the cellulose xanthate contains comparatively little unxanthated fiber. When ripened, the solution may be spun into light-colored rayon filaments of excellent physical characteristics.

While I have cited the use of the permanganates in the specific examples given, I regard the manganates as their chemical equivalents, as they may be successfully employed in carrying out the process of the present invention.

I claim:

1. A process which comprises treating cellulose fiber with a solution containing caustic soda and a soluble permanganate under non-mercerizing temperature conditions, and then under mercerizing temperature conditions.

2. A process which comprises treating cellulose fiber at above room temperature with a permanganate solution containing caustic soda in amount insufficient to cause mercerization of the fiber at such temperature but sufficient to cause mercerization at lower temperature, and then cooling the solution sufficiently to effect mercerization of the fiber.

3. A process which comprises treating cellulose fiber under mercerizing conditions with a permanganate solution containing in solution another oxidant until a marked reduction of the solution viscosity of the fiber has been effected, and substantially removing the chemicals and colored reaction products from the fiber.

4. A process which comprises treating cellulose fiber under mercerizing conditions with a permanganate solution while bubbling an oxidant through the solution until a marked reduction of the solution viscosity of the fiber has been effected, and substantially removing the chemicals and colored reaction products from the fiber.

5. A process which comprises treating cellulose fiber under mercerizing conditions with a permanganate solution containing alkali-forming metal hypochlorite until a marked reduction of the solution viscosity of the fiber has been effected, and substantially removing the chemicals and colored reaction products from the fiber.

6. A process which comprises treating cellulose fiber with a permanganate solution under mercerizing conditions, adding sodium sulphide to the solution after the permanganate has been largely consumed, continuing the treatment and washing the treated fiber free from chemicals.

7. A process which comprises treating cellulose fiber with an alkaline permanganate solution, and then treating with an alkaline liquor under mercerizing conditions.

8. A process which comprises treating cellulose fiber with a permanganate solution under mercerizing conditions, washing the fiber, and treating with an alkaline solution under mercerizing conditions.

9. A process which comprises treating cellulose fiber with a permanganate solution under mercerizing conditions, washing the fiber, and treating with an alkaline solution under mercerizing conditions containing a reducing agent.

10. A process which comprises treating cellulose fiber with a permanganate solution under mercerizing conditions, after the permanganate has been largely consumed adding sodium sulphide in amount sufficient to react with the remaining permanganate and manganese oxides formed during the treatment, and washing the treated fiber free from chemicals.

11. A process which comprises treating cellulose fiber with a permanganate solution under mercerizing conditions, adding sodium sulphide to the solution after the permanganate has been largely consumed, continuing the treatment, separating the treated fiber from the solution, oxidizing residual sodium sulphide present therein, and adding permanganate to the solution to condition it for use in the treatment of other fiber.

GEORGE A. RICHTER.